United States Patent
Minoiu-Enache

(10) Patent No.: US 9,535,422 B2
(45) Date of Patent: Jan. 3, 2017

(54) METHOD FOR CONTROLLING THE PATH OF AN AUTONOMOUS VEHICLE HAVING STEERED WHEELS

(71) Applicant: RENAULT s.a.s., Boulogne-Billancourt (FR)

(72) Inventor: Nicoleta Minoiu-Enache, Versailles (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 11 days.

(21) Appl. No.: 14/413,027

(22) PCT Filed: Jul. 1, 2013

(86) PCT No.: PCT/FR2013/051543
§ 371 (c)(1),
(2) Date: Feb. 19, 2015

(87) PCT Pub. No.: WO2014/009631
PCT Pub. Date: Jan. 16, 2014

(65) Prior Publication Data
US 2015/0185734 A1    Jul. 2, 2015

(30) Foreign Application Priority Data
Jul. 12, 2012   (FR) ..................... 12 56716

(51) Int. Cl.
G05D 1/02   (2006.01)
G01C 21/34  (2006.01)

(52) U.S. Cl.
CPC ......... G05D 1/0223 (2013.01); G01C 21/3415 (2013.01)

(58) Field of Classification Search
None
See application file for complete search history.

(56) References Cited

U.S. PATENT DOCUMENTS 6,370,452 B1 *  4/2002  Pfister .................. G05D 1/0297
                                                 701/23
7,970,574 B2 *  6/2011  Jin ........................ G01S 5/0289
                                                 370/254

(Continued)

FOREIGN PATENT DOCUMENTS

WO    WO2012008085 A1 *   1/2012  ............... G05D 1/02

OTHER PUBLICATIONS

International Search Report issued Nov. 8, 2013 in PCT/FR2013/051543.

(Continued)

*Primary Examiner* — John R Olszewski
*Assistant Examiner* — James M McPherson
(74) *Attorney, Agent, or Firm* — Oblon, McClelland, Maier & Neustadt, L.L.P.

(57) ABSTRACT

A method for controlling the position and speed of a vehicle having steered wheels includes, determining an overall path comprising a plurality of points and defining the course of the vehicle between a starting point and an endpoint; determining the current position of the vehicle; if the current position does not correspond to a point on the overall path, generating a local path connecting the current position of the vehicle to a point on the overall path; and generating control signals in order to steer the steered wheels and control the speed of the vehicle so that the vehicle moves along the local path. The control signals are generated by convex optimization of linear matrix inequalities.

6 Claims, 4 Drawing Sheets

(56) References Cited

U.S. PATENT DOCUMENTS

2011/0118927 A1* 5/2011 Cima .................. G05D 1/0088
                                                       701/26
2013/0116880 A1* 5/2013 Shitamoto ............. G05D 1/024
                                                       701/25

OTHER PUBLICATIONS

Christophe Cariou, et al., "Autonomous maneuver of a farm vehicle with a trailed implement: motion planner and lateral-longitudinal controllers" 2010 IEEE International Conference on Robotics and Automation, XP031743382, May 2010, pp. 3819-3824.
Maciej Michalek, et al., "Feedback control framework for car-like robots using the unicycle controllers" Robotica, vol. 30, No. 4, XP009166456, Jul. 25, 2011, pp. 517-535.
R. Gonzalez, et al., "Adaptive Control for a Mobile Robot under Slip Conditions using an LMI-based Approach" Proceedings of the European Control Conference 2009, XP009166435, Aug. 23, 2009, pp. 1251-1256.
Shai A. Arogeti, et al., "Path Following of Autonomous Vehicles in the Presence of Sliding Effects" IEEE Transactions on Vehicular Technology, vol. 61, No. 4, XP11443462, May 9, 2012, pp. 1481-1492.

* cited by examiner

METHOD FOR CONTROLLING THE PATH OF AN AUTONOMOUS VEHICLE HAVING STEERED WHEELS

TECHNICAL FIELD

The present invention relates to a method for controlling the path of a vehicle which has at least one steered wheel and which is capable of moving in autonomous mode.

More specifically, the invention relates to the control of the position and speed of a vehicle when the vehicle is in autonomous mode, at low speed, that is to say a speed of less than 10 m/s (36 km/h), and preferably for corners whose radius may be as small as the minimum corner radius found for the maximum steering of the vehicle.

PRIOR ART

The autonomous control mode, that is to say the driverless mode, is useful for the provision of many services, for example automatic parking services, a valet service (autonomous movement of the vehicle toward a parking place), automatic recharging services (autonomous movement of the vehicle toward a recharging terminal), driverless transportation services for persons with limited mobility, and services for rebalancing vehicle fleets by positioning vehicles in groups.

In this autonomous mode, a target overall path is generally specified, defining the course to be followed by the vehicle between a starting point and an endpoint. This overall path is spatial; that is to say, it defines the position of a plurality of points through which the vehicle must pass. The vehicle is then controlled so as to follow this target path. In real conditions, however, the vehicle always deviates from this target path because of many perturbations present in the environment in which the vehicle moves, such as wind, deformations of the road surface, a slippery road surface due to rain or ice, banking, and the like. To make the vehicle return to the target path, there are known methods, notably that disclosed in patent application EP 2 280 241, for continuously calculating the current position of the vehicle and, if the current position of the vehicle no longer corresponds to the position of a point on the target path, determining a local path, which is both spatial and temporal, to make the vehicle return to the target overall path. This local path defines the position of a plurality of points through which the vehicle must pass, and a speed at each of these points. Control signals for the vehicle are then generated to make the vehicle follow this local path and return to the target path. These signals are generated in real time by optimization of a nonlinear function, this optimization requiring a large amount of computing capacity. In addition to the position of the vehicle, it is also necessary to measure its speed, together with a plurality of other signals, for example the acceleration and the rate of variation of the acceleration.

DESCRIPTION OF THE INVENTION

The object of the invention is to propose a method for controlling the path of an autonomous vehicle which is simple to implement without requiring a large amount of computing capacity.

The present invention proposes a method for controlling the position and speed of a vehicle capable of moving in an autonomous manner and having at least one steered wheel, said method comprising the following steps:

determining an overall path defining the course of the vehicle between a starting point and an endpoint, said overall path comprising a plurality of intermediate points between the starting point and the endpoint, a position being defined for each point of the overall path;

determining the current position of the vehicle;

if the current position does not correspond to a point on the overall path, generating a local path connecting the current position of the vehicle to a point on the overall path so that the vehicle returns to the overall path, said local path comprising a plurality of points, a position and a speed being defined for each point of the local path;

generating a steering control signal for the steered wheel and a speed control signal for the vehicle so that the vehicle moves along said local path;

characterized in that the steering and speed control signals are generated by convex optimization of linear matrix inequalities.

This convex optimization of linear matrix inequalities (referred to as "linear matrix inequalities" in the English literature) is used for controlling the path of unicycle robots driven by two independent non-directional wheels as mentioned in the document "Adaptive control for a mobile robot under slip conditions using an LMI-based approach" Gonzalez, R., Fiacchini, M., Alamo, T., Guzman, J. L., Rodriguez, F. (2010), European Journal of Control, 16:144-158.

Since unicycle robots do not have steered wheels, the control law for the wheels is very different from that for vehicles with steered wheels, notably because vehicles with steered wheels have a smaller maximum steering angle. Provision is therefore made to add supplementary constraints to the control law of the vehicle, as compared with the control of a unicycle robot.

The generation of the steering control signal and of the speed control signal comprises the following steps:

determining a kinematic model for the vehicle; and determining the vehicle steering and speed control signals on the basis of said kinematic model by convex optimization of linear matrix inequalities.

According to one embodiment of the invention, the kinematic model of the vehicle is determined on the basis of a kinematic model of a robot having two independent wheels, the kinematic model of the robot being supplemented by a plurality of constraints specific to vehicles having steered wheels.

Said plurality of constraints specific to vehicles having steered wheels comprises:

a stability constraint which is asymptotic with respect to the local path;

a constraint of limitation of curvature of the local path;

a constraint of continuity and derivability of the steering and speed control signals; and a constraint for the feasibility of transposing the kinematic model from a robot having two independent wheels to a vehicle having at least one steered wheel.

Advantageously, the model is supplemented with one or more constraints from among the following:

a constraint of limitation of the variation of the control signals;

a constraint on the starting area of the control signals;

a constraint on the placing of the closed-loop poles of the model.

The invention also proposes a device for controlling the position and speed of a vehicle capable of moving in an autonomous manner and having at least one steered wheel, said device comprising:

a location and navigation circuit for determining:
   an overall path defining the course of the vehicle between a starting point and an endpoint, said overall path comprising a plurality of intermediate points between the starting point and the endpoint, a position being defined for each point of the overall path;
   the current position of the vehicle;
   if the current position does not correspond to a point on the overall path, generation of a local path connecting the current position of the vehicle to a point on the overall path, said local path comprising a plurality of points, a position and a speed being defined for each point of the local path;
a computer for generating a steering control signal for the steered wheel and a speed control signal for the vehicle so that the vehicle moves along said local path;
characterized in that the computer generates the steering and speed control signals by convex optimization of linear matrix inequalities.

Other advantages may also be apparent to persons skilled in the art from a reading of the examples below, illustrated by the appended drawings which are provided for illustrative purposes.

DETAILED DESCRIPTION OF AT LEAST ONE EMBODIMENT

Figure 1:
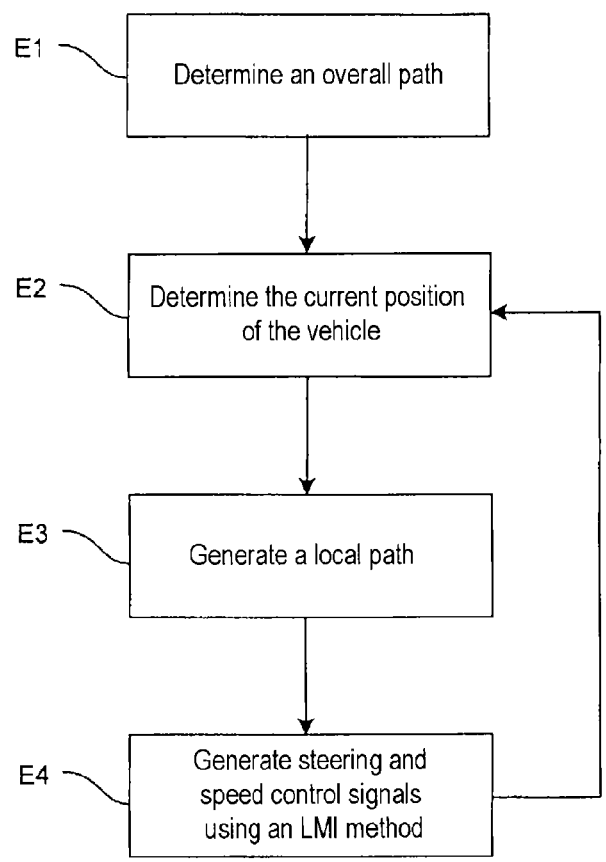
FIG. 1 shows a flow chart of the steps of the method of the invention.
Figure 2:
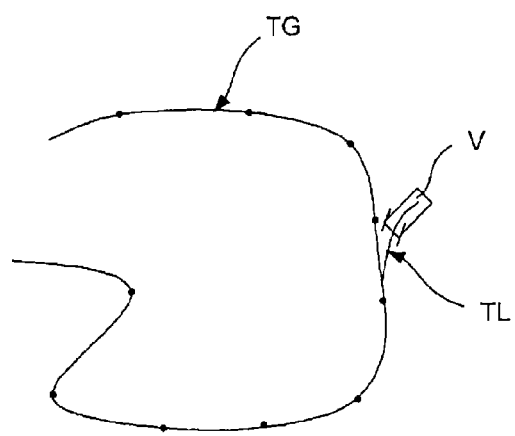
FIG. 2 is a diagram showing how a local path is followed in order to return toward an overall path.

With reference to FIGS. 1 and 2, the method of the invention comprises the following steps:

Step E1: an overall path TG is determined between a starting point and an endpoint; this path defines the desired course of the vehicle; it comprises a plurality of intermediate points between the starting point and the endpoint, a position being defined for each point of the overall path; the positions of the points on the path are, for example, GPS (Global Positioning System in English) positions; the points may or may not be regularly spaced along the path;

Step E2: the current position of the vehicle V whose path is to be controlled is determined by an appropriate location system;

Step E3: if the vehicle V has deviated from the overall path TG, a local path TL is generated, connecting the current position of the vehicle to a point on the overall path so that the vehicle returns to the overall path, as shown in FIG. 2; the local path TL comprises a plurality of points; a position and a speed are defined for each of the points of the local path; these points are preferably less widely spaced than the points of the overall path TG;

Step E4: a steering control signal for the steered wheels of the vehicle and a speed control signal are generated, enabling the vehicle to move along said local path; the steering control signal is the desired steering angle $\delta_{car}$ for the vehicle, and the speed control signal is the desired speed $u_{car}$ for the vehicle; according to the invention, these control signals are generated by a convex optimization of linear matrix inequalities.

Figure 3:
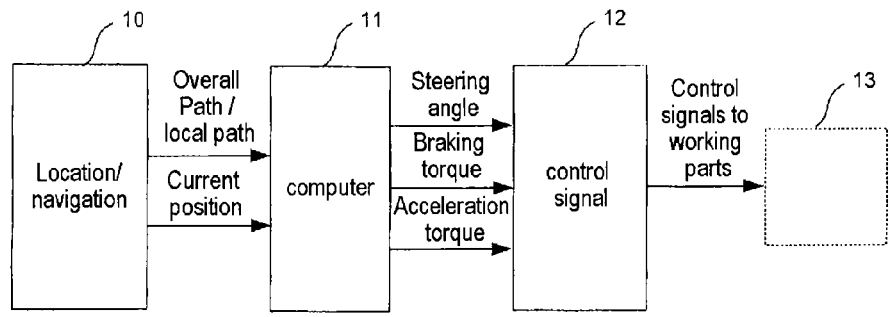
FIG. 3 is a diagram of a device for implementing the method shown in the figure.
Figure 8:
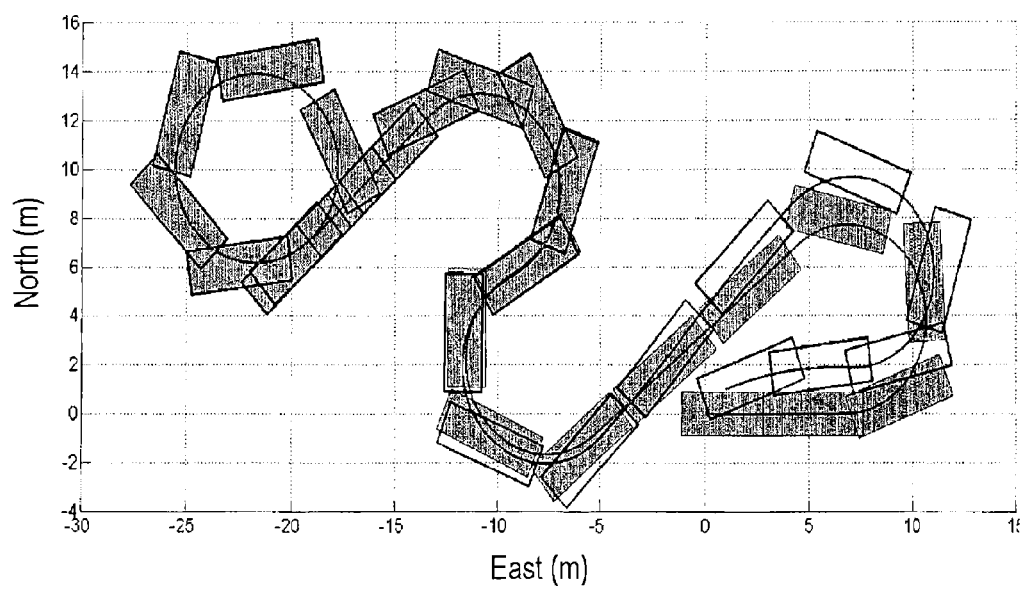
FIG. 8 is a diagram showing the performance of the method of the invention.

These steps are executed by the device as shown in FIG. 3. This comprises:

a location and navigation circuit 10: this circuit is responsible for calculating the overall and local paths, and for supplying the current position of the vehicle; this circuit executes steps E1 to E3;

a computer 11: this computer is responsible for calculating the desired steering angle $\delta_{car}$ and the desired speed $u_{car}$ and for converting the speed $u_{car}$ into an acceleration torque or a braking torque; this computer therefore executes step E4 of the method of the invention.

This device further comprises a control circuit 12 which, on the basis of the desired steering angle $\delta_{car}$ and the desired acceleration or braking torque, generates control signals for various working parts 13 of the vehicle, notably the steering column, the brakes, and the engine.

An important characteristic of the invention is seen in the execution of step E4. According to the invention, in order to generate control signals enabling the vehicle to follow the local path which is the reference path, a method developed for "unicycle" robots with two independent wheels is used, with the addition of supplementary constraints relating to the control of the path of a vehicle having steered wheels. According to this method, the control signals are generated by convex optimization of linear matrix inequalities (LMI convex optimization).

The method for unicycle robots is, notably, described in the document "Adaptive control for a mobile robot under slip conditions using an LMI-based approach", by Gonzalez, R., Fiacchini, M., Alamo, T., Guzman, J. L., Rodriguez, F., (2010), European Journal of Control, 16:144-158. The supplementary constraints are partially described in the document "Feedback control framework for car-like robots using unicycle controllers", Michalek, M. and Kozlowski, K, (2011), Robotica, pages 1-19, Cambridge University Press.

The generation of the steering and speed control signals according to the invention is described in detail below. This generation comprises the following steps:

A—determination of a kinematic model of the vehicle having steered wheels; and

B—determination of a control law by LMI convex optimization.

A—Definition of a Kinematic Model for the Vehicle

For the purpose of modelling the vehicle, it is assumed that the vehicle wheels are rigid at low speed. The kinematic model of the vehicle is then defined by the following relation:

$$\begin{cases} \dot{x} = \upsilon \cdot \cos\theta \\ \dot{y} = \upsilon \cdot \sin\theta \\ \dot{\theta} = \dfrac{\upsilon}{L} \cdot \tan\delta \\ \dot{\delta} = u \end{cases} \quad (1)$$

where—x is the position of the point M on the x axis, denoted $X_a$, of an absolute reference frame, M being the midpoint of the rear axle unit of the vehicle;
  y is the position of the point M on the y axis, denoted $Y_a$, of the absolute reference frame;
  δ is the heading angle of the vehicle at point M in the absolute reference frame;
  u is the speed of the vehicle at point M,
  δ is the steering angle of the front wheels of the vehicle, that is to say the angle of the front wheels relative to the longitudinal axis of the vehicle, and
  L is the distance between the front and rear axles of the vehicle.

Figure 4:
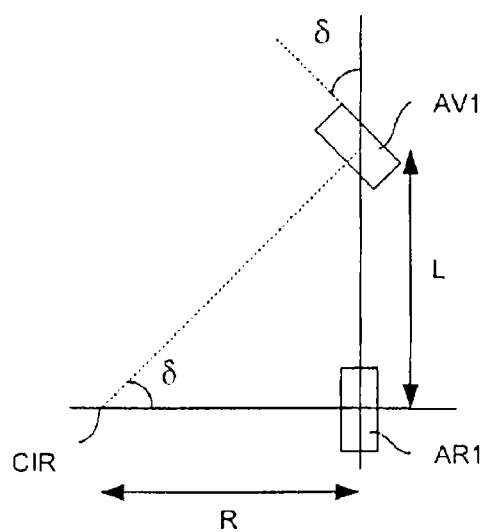
FIG. 4 is a diagram showing the steering angle δ of the front wheels of a vehicle.

The parameters δ and L can be seen in FIG. 4, which shows the steering of a front wheel AV1 of a vehicle through an angle δ relative to the directional axis of a corresponding rear wheel AR1. In this figure, R denotes the distance between the instantaneous center of rotation CIR and the wheel AR1. If we consider the vehicle and its four wheels, and assume that the front wheels have an identical steering angle, then R is the distance between the instantaneous center of rotation and the point M. R is also called the radius.

It then follows that:

$$u = R \cdot \omega \text{ and } \tan\delta = L/R$$

Therefore, ω=u/R=u·tan δ/L

This model can thus be described as a three-state system (x,y,θ) with a supplementary dynamic as defined by the following relation:

$$\begin{cases} \dot{x} = \upsilon \cdot \cos\theta \\ \dot{y} = \upsilon \cdot \sin\theta \\ \dot{\theta} = \omega \end{cases} \quad (2)$$

$$\dot{\delta} = u \text{ where } \varpi = u \cdot \tan\delta/L$$

The upper part of relation (2) describes a system of the two-wheeled robot type, conventionally known as a "unicycle". The path of the vehicle is controlled by making the variables (x,y,θ) converge toward a point M' $(x_r,y_r,\theta_r)$ of the reference path which is the local path, and then by calculating the corresponding steering angle, saturating it at the maximum possible steering angle of the vehicle.

The desired steering angle $\delta_{car}$ for the vehicle is then written thus:

$$\delta_{car} = sat\left(\arctan\left(\dfrac{L\omega}{\upsilon}\right), \delta_{max}\right) \quad (3)$$

where $\delta^{max}$ is the maximum steering angle of the vehicle.

A steering control, of the proportional type for example, must then be added to make the angle δ converge toward the desired steering angle $\delta_{car}$.

The reference path may also be described by the following relation:

$$\begin{cases} \dot{x}_r = \upsilon_r \cdot \cos\theta_r \\ \dot{y}_r = \upsilon_r \cdot \sin\theta_r \\ \dot{\theta}_r = \omega_r \end{cases} \quad (4)$$

where—$x_r$ is the position of point M' of the reference path on the axis $X_a$ of the absolute reference frame;
  $y_r$ is the position of point M' of the reference path on the axis $Y_a$ of the absolute reference frame;
  $\theta_r$ is the heading angle at point M' of the reference path in the absolute reference frame;
  $u_r$ is the speed at point M' of the reference path in the absolute reference frame, and
  $\omega_r, \dot{\theta}_r$ is the yaw speed of the reference path.

The path error $e_a$ of the vehicle relative to the reference path in the absolute reference frame is given by the relation:

$$(e_x^a, e_y^a, e_\theta^a)^T = (x_r - x, y_r - y, \theta_r - \theta)^T \quad (5)$$

where—$e_x^a$ is the path error of the vehicle at point M relative to point M' of the reference path on the axis $X_a$ of the absolute reference frame;
  $e_y^a$ is the path error of the vehicle at point M relative to point M' of the reference path on the axis $Y_a$ of the absolute reference frame; and
  $e_\theta^a$ is the heading error of the vehicle path at point M relative to point M' of the reference path in the absolute reference frame.

Figure 5:
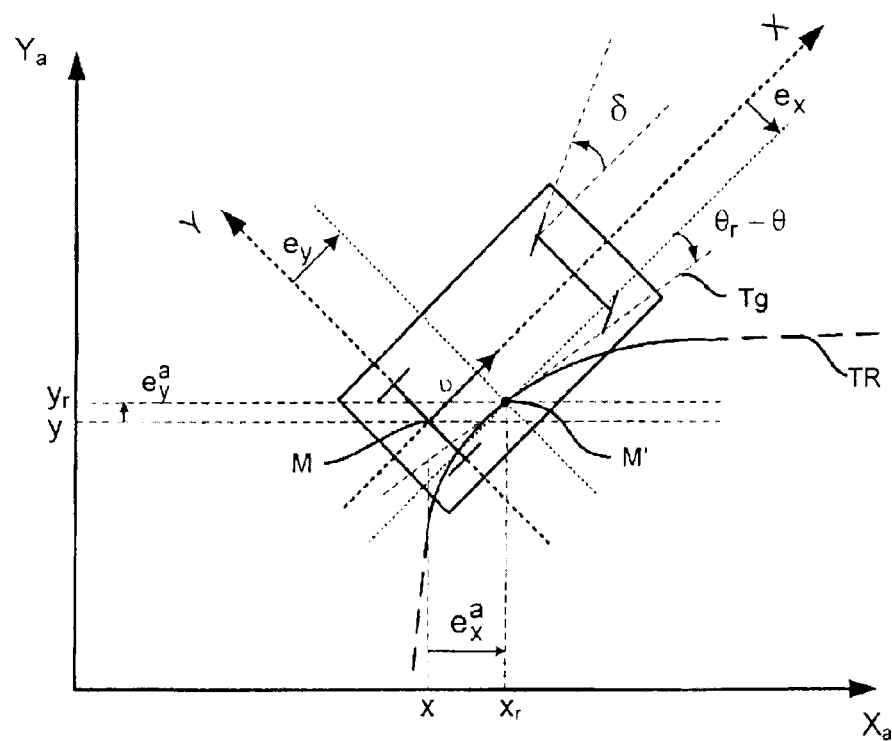
FIG. 5 is a diagram showing the kinematic parameters of a vehicle in an absolute reference frame $(X_a, Y_a)$ and a relative reference frame (X,Y) associated with the vehicle.

The error e in a relative reference frame associated with the vehicle, such as the reference frame (X,Y) of FIG. 5, is given by the following relation:

$$e = \begin{pmatrix} \cos\theta & \sin\theta & 0 \\ -\sin\theta & \cos\theta & 0 \\ 0 & 0 & 1 \end{pmatrix} e^a = Te^a \quad (6)$$

When equation (6) is derived, the dynamics of the error in the relative reference frame then become:

$$\begin{cases} \dot{e}_x = \upsilon_r \cos e_\theta + \omega e_y - \upsilon \\ \dot{e}_y = \upsilon_r \sin e_\theta + \omega e_x \\ \dot{e}_\theta = \omega_r - \omega \end{cases} \quad (7)$$

A first order development about a zero relative error e=0 then yields the following linear differential system:

$$\begin{pmatrix} \dot{e}_x \\ \dot{e}_y \\ \dot{e}_\theta \end{pmatrix} = \begin{pmatrix} 0 & \omega_r & 0 \\ -\omega_r & 0 & \upsilon_r \\ 0 & 0 & 0 \end{pmatrix} \begin{pmatrix} e_x \\ e_y \\ e_\theta \end{pmatrix} + \begin{pmatrix} 1 & 0 \\ 0 & 0 \\ 0 & 1 \end{pmatrix} \begin{pmatrix} \upsilon_r - \upsilon \\ \omega_r - \omega \end{pmatrix} \quad (8)$$

where—$e_x$ is the path error of the vehicle at point M relative to the reference path on the axis X of the relative reference frame;
  $e_y$ is the path error of the vehicle at point M relative to the reference path on the axis Y of the relative reference frame;
  $e_e$ is the heading error of the vehicle path relative to the reference path in the relative reference frame.

Note that, in FIG. 5, Tg denotes the tangent of the reference path TR at point M'.

Relation (8) can then be written thus:

$$\text{i.e. } \dot{e} = A(t) \cdot e + B \cdot \psi \quad (9)$$

where $\psi = (u_r - u, \omega_r - \omega)^T$ $$A(t) = \begin{pmatrix} 0 & \omega_r & 0 \\ -\omega_r & 0 & v_r \\ 0 & 0 & 0 \end{pmatrix}$$

$$B(t) = \begin{pmatrix} 1 & 0 \\ 0 & 0 \\ 0 & 1 \end{pmatrix}$$

Relation (9) is a linear dynamic system varying as a function of time, because the reference speeds $u_r$ and $w_r$ are not constant.

However, these referencespeeds vary between known limits:

$$v_r \in [v_r^{min}; v_r^{max}] \text{ and } \omega_r \in [\omega_r^{min}; \omega_r^{max}] \quad (10)$$

The value $v_{r\text{-}hu\ min}$ is not equal to 0, because the vehicle cannot be controlled when stationary.

The state matrix of the system described by relation (9) therefore varies between known limits described by the convex envelope of the four peaks, as defined below:

$$A(t) \in A = Co\{A_1, A_2, A_3, A_4\}$$

where—Co is the convex envelope;
$A_1 = A(v_r^{min}; \omega_r^{min})$
$A_2 = A(v_r^{min}; \omega_r^{max})$
$A_3 = A(v_r^{max}; \omega_r^{min})$
$A_4 = A(v_r^{max}; \omega_r^{max})$ This kinematic model is completed by adding supplementary constraints specific to vehicles with steered wheels. The path control obtained for a "unicycle" vehicle may be applied to a vehicle having steered wheels if constraints or conditions are added to ensure stability and correct following of the reference path. These constraints are as follows:

Condition 1. $(x_r, y_r, \theta_r)$ must satisfy relation (4)

$$\left| \frac{\dot{\theta}_r}{\dot{x}_r \cos(\theta_r) + \dot{y}_r \sin(\theta_r)} \right| \leq \left| \frac{\tan(\delta^{max})}{L} \right|. \quad \text{Condition 2}$$

$$\frac{\partial(v, \omega)^T}{\partial(e_x^a, e_y^a, e_\theta^a)} \in L_\infty^3 \text{ and } \frac{\partial(v, \omega)^T}{\partial t} \in L_\infty^2. \quad \text{Condition 3}$$

$$\left| \frac{\omega}{v} \right| \leq \left| \frac{\tan(\delta^{max})}{L} \right| \text{ for virtually all } t > 0. \quad \text{Condition 4}$$

Conditions 1, 2 and 3 relate to the reference path and Condition 4 relates to the feasibility of the transposition of the control laws designed for a "unicycle" vehicle to a vehicle having steered wheels.

More specifically, Condition 1 ensures that asymptotic stability is possible along the reference path. Condition 2 specifies a limited curvature of the reference path, which can be achieved with the maximum steering angle $\delta^{max}$ of the steered wheels of the passenger vehicle. Condition 3 specifies continuity and derivability of the control inputs (u,ω) so as to provide a desired steering angle which is continuous for the vehicle. This condition can be used, for example, to specify that the steering angle must not change suddenly, from 10° to 40° for example. Finally, Condition 4 acts on the necessary relation between the longitudinal speed v and the rotation speed ω to comply with the limit of the maximum steering angle $\delta_{max}$.

These four conditions are defined in the document "Feedback control framework for car-like robots using unicycle controllers", by Michalek, M. and Kozlowski, K., (2011), Robotica, pages 1-19, Cambridge University Press.

According to an advantageous embodiment, other constraints are added, namely a constraint on the placing of the closed-loop poles of the model, a constraint limiting variations of the control signals with respect to the control signals followed by the reference path, and a constraint on the starting area of the control signals.

B—Determination of a Control Law by LMI Convex Optimization

The control law $(u_{car}, \delta_{car})$ that is implemented is based on a linear combination of static gains K, valid at the following peaks:

$$\mathfrak{R} = \{(v_r^{min}, \omega_r^{min}), (v_r^{min}, \omega_r^{max}), (v_r^{max}, \omega_r^{min}), (v_r^{max}, \omega_r^{max})\} \quad (12)$$

This control law is based on the following relations:

$$(v_r, \omega_r) = \sum_{i=1}^{4} \lambda_i \mathfrak{R}(i) \quad (13)$$

$$A(t) = \sum_{i=1}^{4} \lambda_i A_i$$

$$\sum_{i=1}^{4} \lambda_i = 1, \text{ where } \lambda_i \geq 0, \forall i \in [1 \ldots 4]$$

Figure 6:
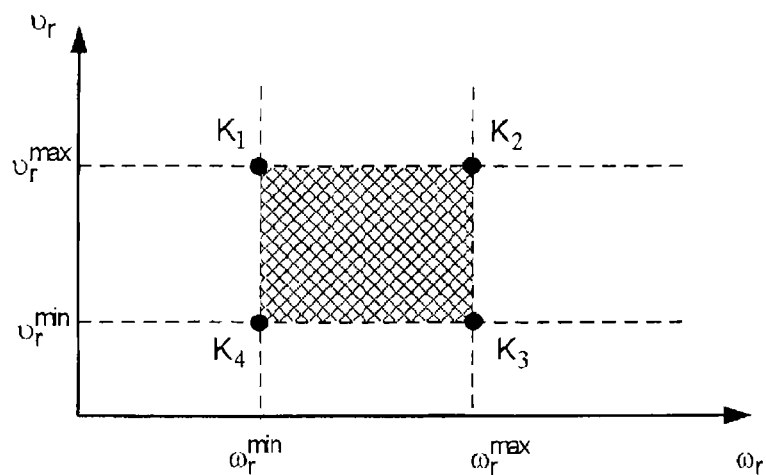
FIG. 6 is a diagram showing the authorized control signal area for the steering and speed control signals according to the method of the invention.

At each instant a control gain K is selected, which is a linear combination $$K = \sum_{i=1}^{4} \lambda_i K_i$$

of gains at the four peaks as shown in FIG. 6. The parameters $\lambda_i$ are weighting coefficients, the sum of which is equal to 1. For example, $$K = 0.1 K1 + 0.15 K2 + 0.2 K3 + 0.55 K4$$

The control gains $K_i$ are in fact the control feedback gains on the error, which are used to calculate the speed control signal $u_{car}$ and steering control signal $\delta_{car}$ of the vehicle. The gain K and the gains $K_i$ take the form of a 2×3 matrix. The first row of the matrix K contains the control feedback gains on the errors $e_x$, $e_y$ and $e_\theta$ for the control input $u_{car}$ ($u_{car} = u_r - K_{11} * e_x - K_{12} * e_y - K_{13} * e_\theta$). The second row of the matrix K contains the control feedback gains on the errors $e_x$, $e_y$ and $e_z$ for the rotation speed $\omega$ ($\omega = \omega_r - K_{21} * e_x - K_{22} * e_y - K_{23} * e_\theta$). Since the steering control signal $\delta_{car}$ is connected to the rotation speed w by the relation (3), the second row of the matrix of the gain K implicitly contains the control feedback gains on the errors $e_x$, $e_y$ and $e_\theta$ for the steering control signal $\delta_{car}$.

The weighting coefficients $\lambda_i$ of the contribution of each gain $K_i$ are found in real time by solving a linear system of three equations for four unknowns $(\lambda_1, \lambda_2, \lambda_3, \lambda_4)$ resulting from relation (13). Two equations are obtained from $$A(t) = \sum_{i=1}^{4} \lambda_i A_i$$

because the matrix A is underdetermined (one of its rows contains only zeroes). The third equation is $$\sum_{i=1}^{4} \lambda_i = 1.$$

This calculation is fairly undemanding in terms of computation and the first solution found is generally sufficient. Instead of carrying out this calculation in real time, it is also possible to use a predetermined table which, for values $U_r$ and $\omega_r$ in the range between the minimum and maximum values $(v_r^{min}, v_r^{max})$ and $(\omega_r^{min}, \omega_r^{max})$ respectively, provides weighting coefficients $(\lambda_1, \lambda_2, \lambda_3, \lambda_4)$.

In the following paragraphs, an LMI convex optimization problem is defined for the calculation of the gains $K_i$. This problem is defined offline and its calculation time is about 10 s on an ordinary office PC using Matlab and the Robust Control Toolbox.

Conditions 1 and 4 are transformed below in the form of linear matrix inequalities. Condition 2 is not transformed, because the reference path is an input of the control law. Additionally, Condition 3 is satisfied by the choice of a linear control law in K ($u_{car}=u_r-K_{12}*e_y-K_{13}*e_\theta$ and $\omega_r-K_{21}*e_x-K_{22}*e_y-K_{23}*e_\theta$).

B-1 Transformation of Condition 1 into a Matrix Inequality

Closed-loop asymptotic stability is obtained if the state matrix of the dynamic system A(t) has negative eigenvalues:

$$\dot{e} = \sum_{i=1}^{4} \lambda_i (A_i + BK_i) \cdot e = \sum_{i=1}^{4} \lambda_i A_i e + \sum_{i=1}^{4} \lambda_i BK_i e \quad (14)$$

The condition is satisfied if there is a positive symmetrical 3×3 square matrix Q and 2×3 matrices $Y_i=K_i \cdot Q$ verifying the following matrix inequality:

$$QA_i^T + A_i Q + Y_i^T B^T + BY_i < 0 \quad \forall i \in [1 \ldots 4] \quad (15)$$

Figure 7:
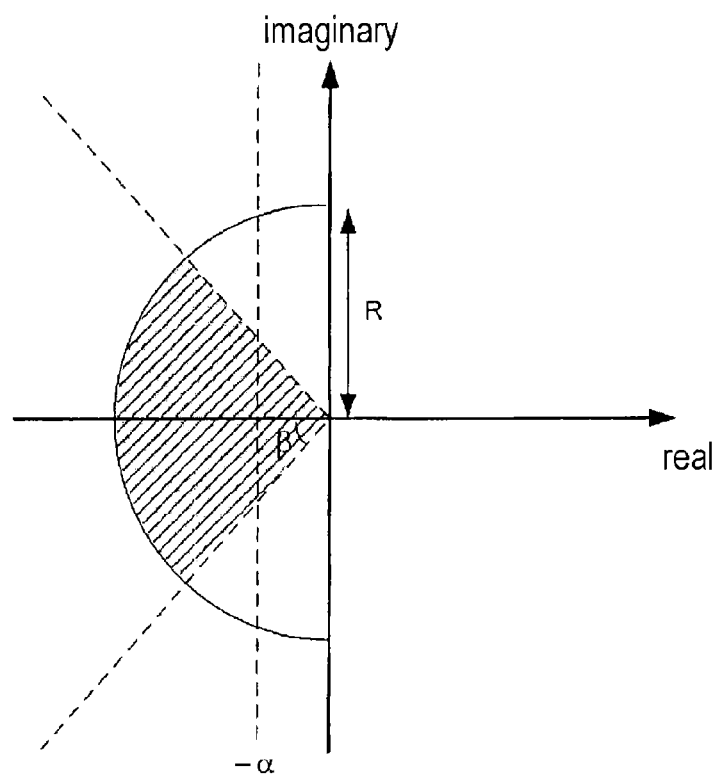
FIG. 7 is a diagram showing a constraint on the placing of the poles of the kinematic model for closed-loop operation.

B-2 Determination of a Matrix Inequality on the Placing of the Closed-Loop Poles The dynamic response of a "unicycle" robot is determined by the position of the eigenvalues in the negative-real half-plane of the real-imaginary plane. To constrain these eigenvalues in a region with a radius r, an aperture 2β, and a real part below α, as shown in FIG. 7, the following inequalities must be satisfied:

$$QA_i^T + A_i Q + Y_i^T B^T + BY_i + 2\alpha Q < 0 \quad (16)$$

$$\begin{pmatrix} -rQ & A_i Q + BY_i \\ QA_i^T + Y_i^T B^T & -rQ \end{pmatrix} < 0$$

$$\begin{pmatrix} M_i \sin\beta & N_i \cos\beta \\ N_i \cos\beta & M_i \sin\beta \end{pmatrix} < 0$$

where $M_i = QA_i^T + A_i Q + Y_i^T B^T + BY_i$ and $N_i = A_i Q - QA_i^T + BY_i - Y_i^T B^T$ These inequalities are defined in the document "H$_\infty$ design with pole placement constraints: An LMI approach", Chilali M. and Gahinet P., 1996, IEEE Transactions on Automatic Control, 41(3):358-367.

B-3 Transformation of Condition 4 into a Matrix Inequality

Not all the control signals (u,ω) that can be executed by a "unicycle" robot are possible for a passenger vehicle. The rotation speed of the vehicle is related to the speed of movement of the vehicle and the steering angle of the steered wheels. If Condition 4 is not met by (u,ω), the steering angle δ requested from the car will be saturated at its maximum value and the vehicle guidance will be of the open-loop type. This then leads to errors in following the reference path. Conformity with Condition 4 is therefore taken into account in the development of the control law defined for the "unicycle" robot:

$$\begin{cases} \left( \frac{1}{L}\tan\delta^{max} \quad 1 \right) \begin{pmatrix} v \\ \omega \end{pmatrix} \geq 0 \\ \left( -\frac{1}{L}\tan\delta^{max} \quad 1 \right) \begin{pmatrix} v \\ \omega \end{pmatrix} \geq 0 \end{cases} \quad (17)$$

The inequalities (17) may also be written:

$$\begin{cases} \lambda_i \left( \frac{1}{L}\tan\delta^{max} \quad 1 \right) K_i e \leq \lambda_i \frac{v_r^j}{L}\tan\delta^{max} + \lambda_i \omega_r^j \\ \lambda_i \left( -\frac{1}{L}\tan\delta^{max} \quad 1 \right) K_i e \leq -\lambda_i \frac{v_r^j}{L}\tan\delta^{max} + \lambda_i \omega_r^j \end{cases} \quad (18)$$

It can then be transformed into the following linear matrix inequalities:

$$\begin{pmatrix} \left( \frac{v_r^j}{L}\tan\delta^{max} + \omega_r^j \right)^2 & \left( \frac{1}{L}\tan\delta^{max} 1 \right) Y_i \\ Y_i^T \left( \frac{1}{L}\tan\delta^{max} 1 \right)^T & Q \end{pmatrix} \geq 0 \quad (19)$$

$$\begin{pmatrix} \left( -\frac{v_r^j}{L}\tan\delta^{max} + \omega_r^j \right)^2 & \left( -\frac{1}{L}\tan\delta^{max} 1 \right) Y_i \\ Y_i^T \left( -\frac{1}{L}\tan\delta^{max} 1 \right)^T & Q \end{pmatrix} \geq 0$$

B-4 Determination of a Matrix Inequality on the Constraint of Limitation of the Variation of the Control Signals It is advantageous to constrain the speed control signals between desired limit values:

$$|v_r - v| \leq \Delta v^{max}$$

$$|\omega_r - \omega| \leq \Delta \Omega^{max} \quad (20)$$

This may also be written as follows:

$$\begin{pmatrix} (\Delta v^{max})^2 & (1 \quad 0) Y \\ Y^T \begin{pmatrix} 1 \\ 0 \end{pmatrix} & Q \end{pmatrix} \geq 0 \quad (21)$$

$$\begin{pmatrix} (\Delta \omega^{max})^2 & (0 \quad 1) Y \\ Y^T \begin{pmatrix} 0 \\ 1 \end{pmatrix} & Q \end{pmatrix} \geq 0$$

B-5 Determination of a Matrix Inequality on the Starting Area of the Control Signals It is advantageous to allow for an area of the monitoring error space in which autonomous control is most likely to start, with the aim of optimizing the response of the system to these situations. This starting area is described by maximum error values. A kind of "tube" is defined around the reference path.

$$Z_0 = Co\{[\pm e_{x0}^{max}, \pm e_{y0}^{max}, \pm e_{\theta 0}^{max}]^T\} = Co\{z_j, j=1 \ldots 2^3\} \quad (22)$$

The linear matrix inequalities corresponding to relation (23) are as follows:

$$\begin{pmatrix} 1 & z_j^T \\ z_j & Q \end{pmatrix} \geq 0 \text{ where } j = 1, \cdots, 2^3 \quad (23)$$

where the $z_j$ are the peaks of the region $Z_0$.

B-6 Calculation of the Gains $K_i$ by LMI Convex Optimization

When all the linear matrix inequalities have been established, the following problem is solved: the trace of matrix Q is minimized under the constraints defined by relations (15), (16), (19), (21) and (23). This minimization operation is well known to those skilled in the art. Minimizing the trace of Q is a matter of minimizing an invariant ellipsoid E (such that $e^T Q e = 1$) which contains the starting area defined above. An invariant ellipsoid is used so that any path starting inside this ellipsoid remains inside it during the convergence toward the equilibrium state. If the trace of the matrix Q is minimized, the sum of the elements on the diagonal of this matrix is minimized, and therefore the length of the half-axes of the ellipsoid E is also minimized. Thus, during convergence, the errors remain as close as possible to the equilibrium point, that is to say zero. This type of minimization is described, for example, in the document "Vehicle assistance system for lane keeping, lane departure avoidance and yaw stability: Approach by simultaneous steering and differential braking", N. Minoiu Enache, S. Mammar, S. Glaser and B. Lusetti, Journal Européen des Systèmes Automatisés, Volume 44, No. 7, pp. 811-852, September-October 2010.

At the end of this minimization operation, the gains $K_i$ are determined.

B-7 Calculation of the Desired Speed $u_{car}$ and the Desired steering Angle $\delta_{car}$ based on the Gains $K_i$ The desired speed $u_{car}$ and the desired steering angle $\delta_{car}$ for the passenger vehicle are calculated by the following formulae:

$$u_{car} = u = u_r - (1 \quad 0) \cdot K \cdot e$$

$$\delta_{car} = sat\left(a\tan\left(\frac{L\omega}{u}\right), \delta^{max}\right), \text{ where } \omega = \omega_r - (0 \quad 1) \cdot K \cdot e$$

The path control according to the invention has the advantage of being calculated in the original maneuvering space of the vehicle, making it possible to provide relatively comprehensive specifications concerning the vehicle response without the need for real time derivatives. The method is applicable to paths with very tight corners and very low speeds of up to 1 m/s, but also to higher speeds, for example 10 m/s. Additionally, the real time calculation of the control signals is uncomplicated.

This invention is applicable to autonomous vehicles or bimodal vehicles with two operating modes, namely manual operation and autonomous operation.

The invention claimed is:

1. A method for controlling a position and speed of a vehicle capable of moving in an autonomous manner and having at least one steered wheel, said method comprising:

determining an overall path defining a course of the vehicle between a starting point and an endpoint, said overall path having a plurality of intermediate points between the starting point and the endpoint;

defining a position being defined for each point of the overall path;

determining a current position of the vehicle;

generating, if the current position does not correspond to a point on the overall path, a local path connecting the current position of the vehicle to a point on the overall path, said local path having a plurality of points, a position and a speed defined for each point of the local path;

controlling, via a steering control signal generated via circuitry, the steered wheel of the vehicle and controlling, via a speed control signal generated via the circuitry, the speed of the vehicle so that the vehicle moves along said local path, wherein the steering and speed control signals are generated by convex optimization of linear matrix inequalities.

2. The method as claimed in claim 1, wherein the generation of the steering control signal and of the speed control signal includes:

determining a kinematic model for the vehicle; and determining the steering and speed control signals on the basis of said kinematic model by convex optimization of linear matrix inequalities.

3. The method as claimed in claim 2, wherein the kinematic model of the vehicle is determined on the basis of a kinematic model of a robot having two independent wheels, the kinematic model of the robot being supplemented by a plurality of constraints specific to vehicles having steered wheels.

4. The method as claimed in claim 3, wherein the plurality of constraints specific to vehicles having steered wheels includes:

a stability constraint which is asymptotic with respect to the local path, a constraint of limitation of curvature of the local path, a constraint of continuity and derivability of the steering and speed control signals, and a constraint for feasibility of transposing the kinematic model from the robot having two independent wheels to a vehicle having at least one steered wheel.

5. The method as claimed in claim 4, wherein the kinematic model is supplemented with one or more constraints from among the following:

a constraint of limitation of the variation of the control signals, a constraint on a starting area of the control signals;

a constraint on placing of closed-loop poles of the model.

6. A device for controlling the position and speed of a vehicle capable of moving in an autonomous manner and having at least one steered wheel, said device comprising:

circuitry configured to:

determine an overall path defining a course of the vehicle between a starting point and an endpoint, said overall path having a plurality of intermediate points between the starting point and the endpoint, defining a position for each point of the overall path, determine a current position of the vehicle, generate, if the current position does not correspond to a point on the overall path, a local path connecting the current position of the vehicle to a point on the overall path, said local path having a plurality of points, a position and a speed being defined for each point of the local path, and control, via a steering control signal, the steered wheel of the vehicle and control, via a speed control signal, the speed of the vehicle so that the vehicle moves along said local path, wherein the computer generates the steering and speed control signals by convex optimization of linear matrix inequalities.

* * * * *